(12) United States Patent
Black et al.

(10) Patent No.: US 11,632,529 B2
(45) Date of Patent: Apr. 18, 2023

(54) PROJECTING CONTENT ONTO WATER TO ENHANCE COMPUTER SIMULATION

(71) Applicant: Sony Interactive Entertainment Inc., Tokyo (JP)

(72) Inventors: Glenn Black, San Mateo, CA (US); Michael Taylor, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 204 days.

(21) Appl. No.: 17/200,718

(22) Filed: Mar. 12, 2021

(65) Prior Publication Data
US 2022/0288489 A1    Sep. 15, 2022

(51) Int. Cl.
*G06F 3/042* (2006.01)
*H04N 9/31* (2006.01)
*A63F 13/27* (2014.01)

(52) U.S. Cl.
CPC ......... *H04N 9/3173* (2013.01); *G06F 3/0426* (2013.01); *A63F 13/27* (2014.09)

(58) Field of Classification Search
CPC ...... G06F 3/0426; G06F 3/0425; G06F 3/042; H04N 9/3173; H04N 9/31; A63F 13/25; A63F 13/27
See application file for complete search history.

(56) References Cited

U.S. PATENT DOCUMENTS

2018/0164976 A1*   6/2018   Ho ............................ G07B 1/00

OTHER PUBLICATIONS

Koike et al., "AquaTop Display: Interactive Water Surface for Viewing and Manipulating Information in a Bathroom," Oct. 6-9, 2013, pp. 155-164 (Year: 2013).*
Matoba et al., "AquaTop Display," Mar. 20-22, 2013, pp. 1-4 (Year: 2013).*

* cited by examiner

*Primary Examiner* — Lisa S Landis
(74) *Attorney, Agent, or Firm* — John L. Rogitz

(57) ABSTRACT

Content is projected onto the surface of water such that it can be viewed from either above or below the surface. Using distortion mapping, depth sensing, and de-noising, the image can remain unaffected by ripples and allow the user to interact within the body of liquid and/or use it as input. Liquids of different density can be layered on the surface to create different refraction planes. Water currents and jets can be used to actively reduce ripples from user interaction, as well as actively adding or removing liquid from the container to counteract displacement or create effect.

19 Claims, 6 Drawing Sheets

PROJECTING CONTENT ONTO WATER TO ENHANCE COMPUTER SIMULATION

FIELD

The present application relates to technically inventive, non-routine solutions that are necessarily rooted in computer technology and that produce concrete technical improvements.

BACKGROUND

As understood herein, with increasing virtualization of experiences particularly in computer games, interesting and exciting enhancements may be made using the medium of water.

SUMMARY

Content is projected onto on the surface of water such that it can be viewed from either above or below the surface. Using distortion mapping, depth sensing, and de-noising, the image can remain unaffected by ripples and allow the user to interact within the body of liquid and/or use it as input. Liquids of different density can be layered on the surface to create different refraction planes. Water currents and jets can be used to actively reduce ripples from user interaction, as well as actively adding or removing liquid from the container to counteract displacement or create effect.

Accordingly, in one aspect a device includes at least one computer memory that is not a transitory signal and that in turn includes instructions executable by at least one processor to project at least one image onto at least one liquid. The instructions are executable to receive indication of an interaction with the image, and based at least in part on the indication, correlate the image to at least one computer action. The instructions are further executable to execute the computer action, which may be an action in a computer simulation.

The liquid may include water and/or oil.

The device may include at least one projector on a drone for projecting the image. The drone may be waterborne and/or airborne.

The indication of an interaction with the image can be received from a camera. Or, the indication of an interaction with the image can be received from a motion sensor. Yet again, the indication of an interaction with the image can be derived from ripples in the liquid.

In another aspect, an assembly includes at least one processor configured with instructions to project one or more images are projected onto liquid. The instructions are executable to receive an indication of interaction with the one or more images, and responsive to the indication, correlate the one or more images with an action, which is executed.

In another aspect, a method includes projecting onto a liquid images of keys of a computer game controller. The method also includes receiving indication of interaction with the images, and based on the indication, controlling a computer game.

The details of the present application, both as to its structure and operation, can best be understood in reference to the accompanying drawings, in which like reference numerals refer to like parts, and in which:

DETAILED DESCRIPTION

Figure 1:
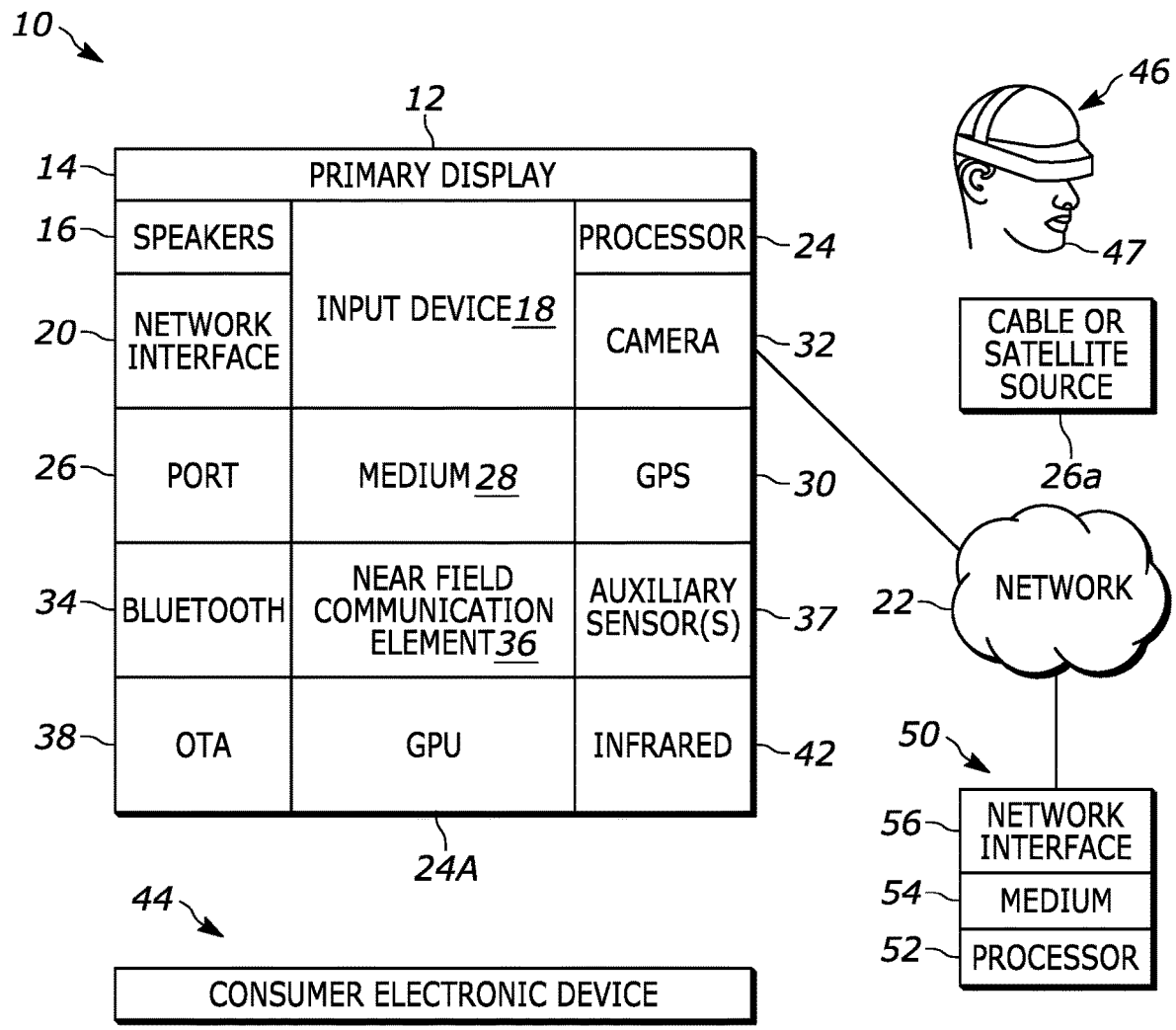
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid-state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm" and may include and perform "cloud" functions such that the devices of the system 10 may access a "cloud" environment via the server 50 in example embodiments for, e.g., network gaming applications. Or the server 50 may be implemented by one or more game consoles or other computers in the same room as the other devices shown in FIG. 1 or nearby.

Components discussed herein may include any or all of the applicable relevant components shown in FIG. 1.

Figure 2:
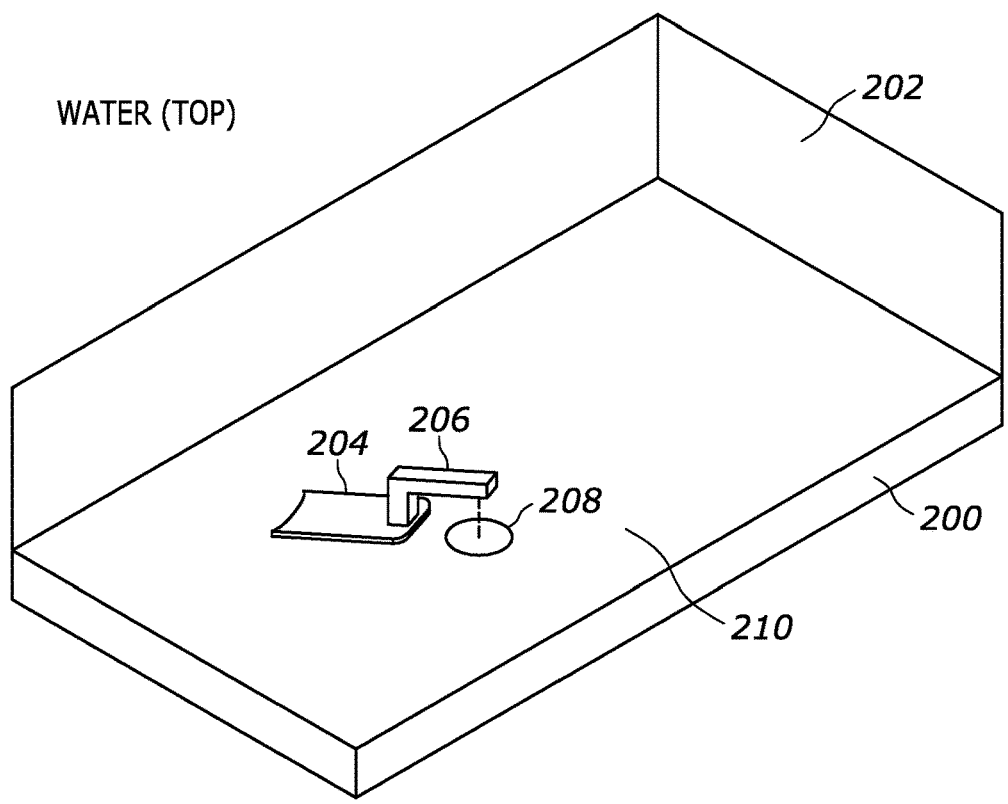
FIG. 2 illustrates a waterborne projector projecting an image onto the surface of water.
Figure 3:
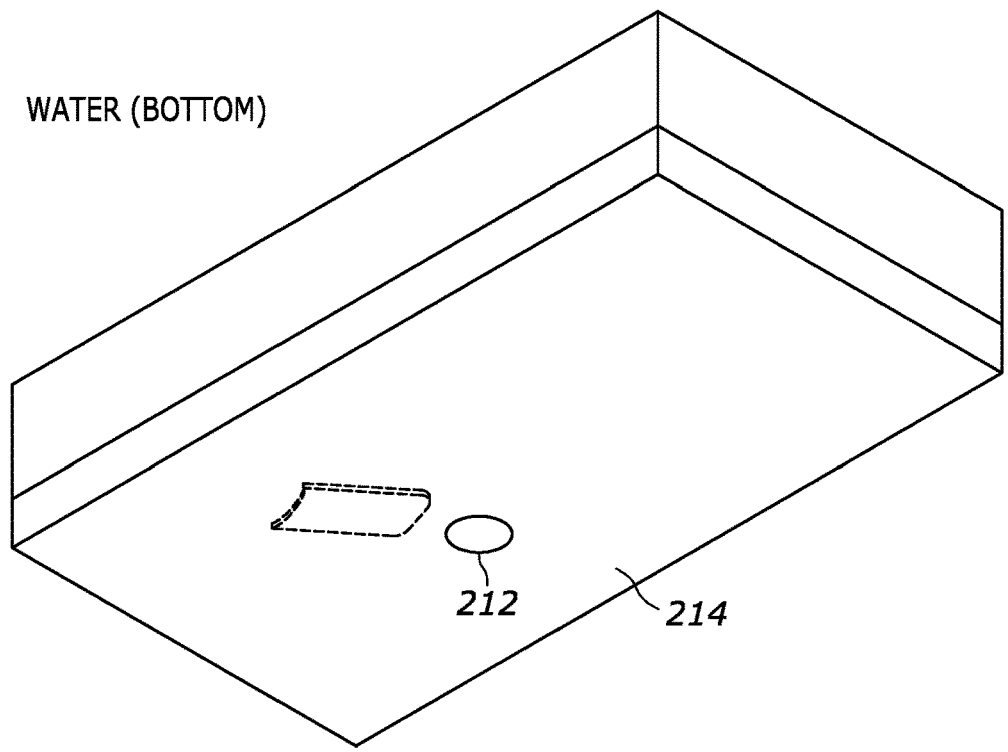
FIG. 3 illustrates that the image of FIG. 2 can propagate through the water to also appear on the bottom of the container.

FIG. 2 illustrates that water 200 in a container 202 such as a tank or pool or other liquid container can support a waterborne drone 204 with an image projector 206 on the drone 204. The projector 206 can project one or more images 208 onto the top surface 210 of the water 200. As shown in FIG. 3, the image can propagate through the water to also appear at 212 on the bottom surface 214 (i.e., on the bottom of the container looking down into the water, with the container being transparent in FIG. 3). Images also may be projected onto the sides of a pool, underwater.

Figure 4:
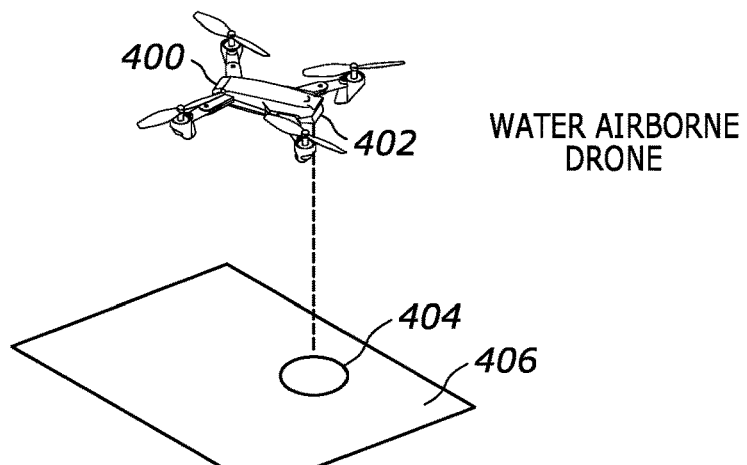
FIG. 4 illustrates an airborne projector projecting an image onto the surface of water.

FIG. 4 illustrates that an airborne drone 400 with projector 402 can project an image 404 onto the surface 406 of water, consistent with principles discussed herein and expanded on below.

The images herein may be flat (two dimensional images) or 3D holograms visible within the water between the top surface and bottom.

Figure 5:
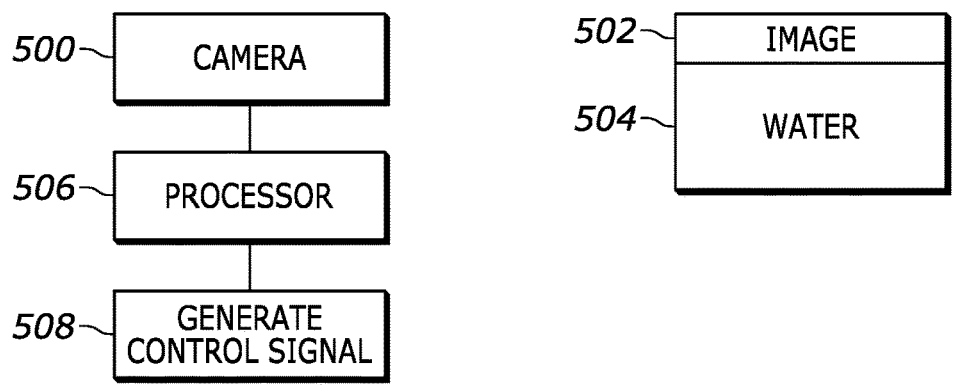
FIG. 5 illustrates a system that generates control signals based on interactions with images on the water.

FIG. 5 illustrates that a camera 500 or other sensor can generate signals representing projected images 502 on or in water 504 and send the signals to a processor 506, such as but not limited to a computer game processor in, e.g., a console or controller of the game. As indicated at 508, the processor 506 may generate control signals to control the game based on the images and/or interaction with the images as indicated by the signals from the cameras 500.

The control signals may be used to, e.g., control movement and other actions of a character in the computer game. The control signals may be used to simulate weapon use in the computer game. Essentially, interaction with the projected image(s) 502 on the water may be detected and used to input computer simulation control signals to the computer simulation in the same way that manipulation of a computer simulation controller is used to generate control signals for computer games.

Figure 6:
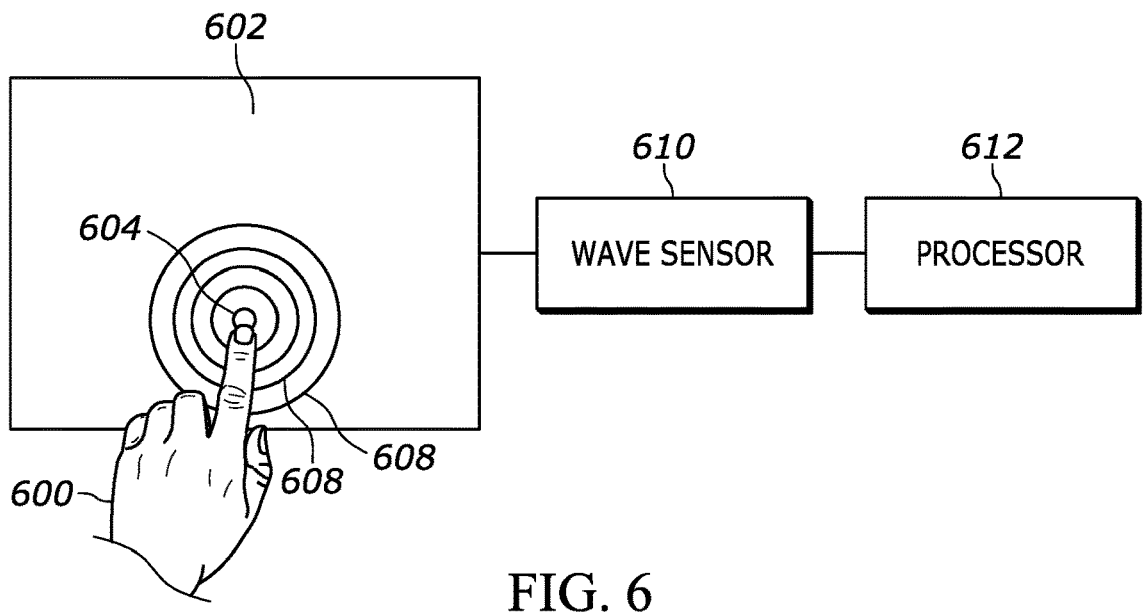
FIG. 6 illustrates sensing interactions with images on the water using wave sensors.

FIG. 6 illustrates that a person can use his or her finger 600 or other body part to touch the surface 602 of water on which an image 604 has been projected. Touching the image 604 causes ripples 606 to propagate outwardly from the point of the touch. A wave sensor 610 can sense the ripples and send signals to a processor 612 to determine the point of touch based thereon as being the origin of the typically circular ripples.

In this way, the processor 612 receiving signals from the wave sensor 610 can determine where the person touched the water and, hence, what projected image the person touched when plural images are projected simultaneously onto the water to known projection locations. In this way, a control signal corresponding to the projected image can be generated for use in a computer game even if the image is obscured by the finger 600.

The wave sensor 610 may include a camera that images the ripples, or motion sensors such as buoy-mounted sensors that detect the wave motion of the ripples, or other appropriate sensor.

Figure 7:
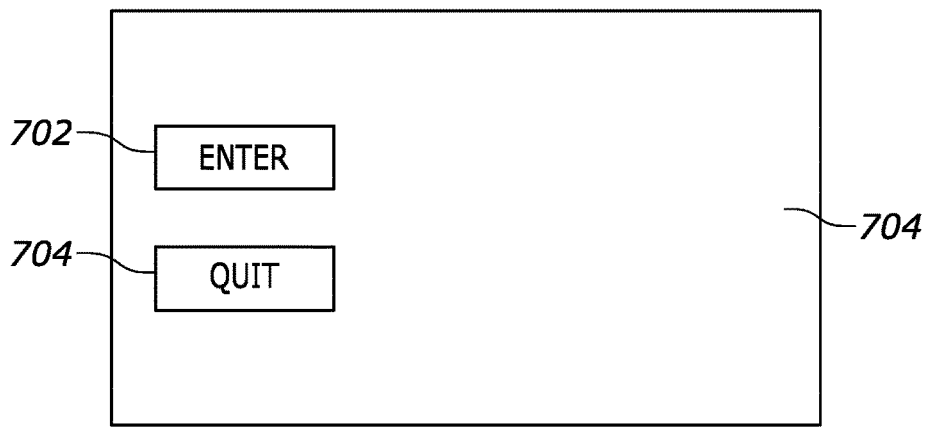
FIG. 7 illustrates example images projected onto water.

FIG. 7 illustrates example images 700, 702 that can be projected onto water 704, with labels corresponding to the control signals associated with the images. In the example shown, the first image, when interacted with, causes an "enter" control signal to be generated and the second image 702, when interacted with, causes a "quit" control signal to be generated.

Figure 8:
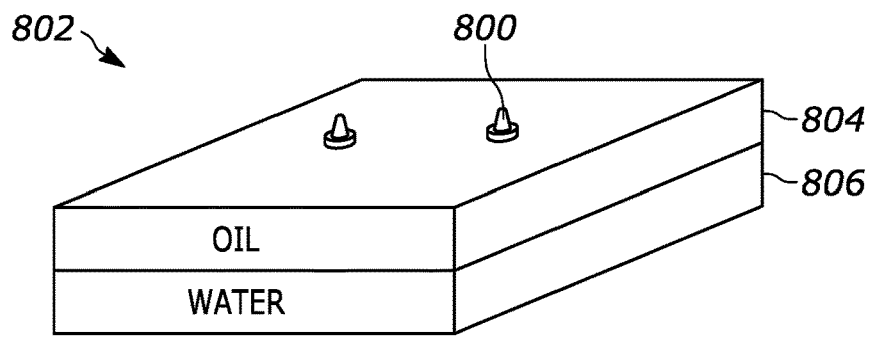
FIG. 8 illustrates buoys in water for sensing motion of the water.

FIG. 8 illustrates that buoys 800 may be placed onto liquid 802 that can include two different types of liquid which may be separated from each other, in the example shown, oil 804 on water 806. The oil 804 may make projected images easier to see on the surface of the combined liquid 802. As alluded to above, the buoys 800 may contain motion sensors to track the ripples shown in FIG. 6 and may also contain depth sensors such as sonic emitters or depth-finders to map the depth of the liquid using sonar principles.

Figure 9:
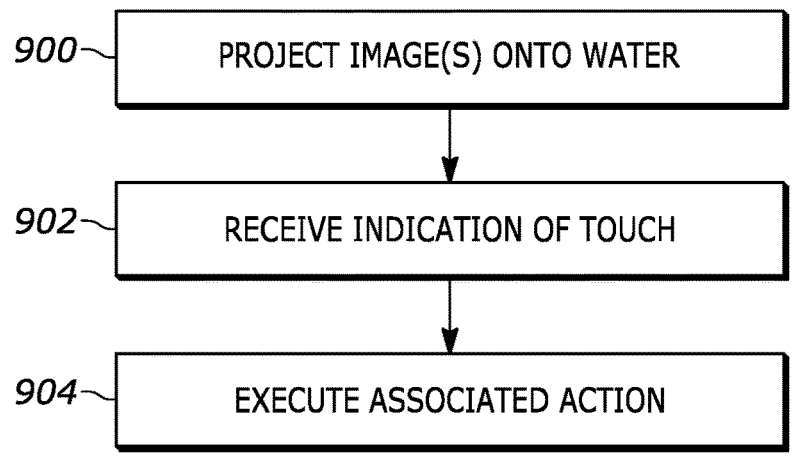
FIG. 9 illustrates example logic in example flow chart format for using images on water as control signal generators.

FIG. 9 further illustrates logic that may be implemented by any of the processors described herein. At block 900 one or more images are projected onto water. The images may be projected onto the surface of water (i.e., focused onto the surface), within the water (such as holograms below the surface), may propagate through the water onto the bottom of the container holding the water, etc.

Moving to block 902, an indication of interaction with one or more images is received. The indication may be a camera image showing part of a person's body co-located with an image. The indication may be signals from motion sensors such as may be mounted on buoys indicating a locus of a series of ripples or other water motion. The indication may be sonic such as may be detected by a sonar system on the side of a pool or on a buoy or drone, with triangulation being used to determine the origin of the sound.

However the interaction is indicated, the logic may move from block 902 to block 904 to correlate the image with an action and execute the associated action. For example, interacting with an image may cause a computer simulation character to jump, to evade a simulated enemy projectile, to fire a simulated weapon, to turn the wheel of a simulated vehicle, etc.

Figure 10:
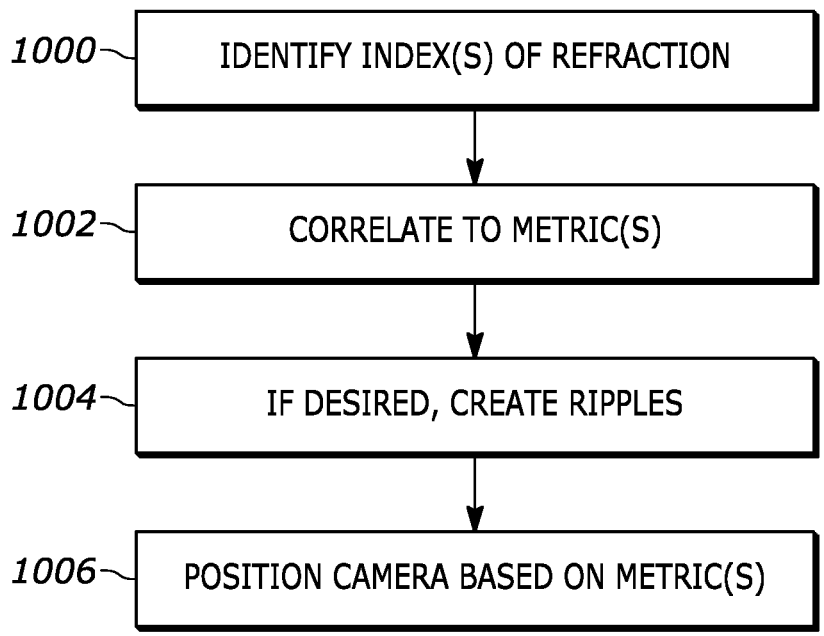
FIG. 10 illustrates example logic in example flow chart format for controlling components based on refraction of light in the water.

FIG. 10 illustrates additional principles. Commencing at block 1000, the index of refraction of liquid into which images are to be projected is identified. This may be done by image recognition of the liquid to identify its type, then correlating the type to a known index of refraction. Or the index of refraction or the liquid type may be input by a developer. Other techniques may be used. For example, a camera in the water close to a target projection location may be used for calibration.

Proceeding to block 1002, the index of refraction is correlated to relevant metrics, such as, for example, a location an image will appear at in the liquid given an angle of incidence of the projection onto the liquid. Snell's law may be used for this purpose.

Ripples may be created if desired at block 1004 using, e.g., motorized paddles on the side of the container holding the liquid or by other means. Such haptic actuators can be used to produce precise ripple effects. For example, they can cause the floor of a pool or edges to vibrate for symmetrical or asymmetrical effects.

Moving to block 1006, based on the metrics determined at block 1002, a camera or a projector or other component may be moved to better detect a projected image, or to project an image into the liquid at a desired location using an angle of incidence that in conjunction with the index of refraction will cause projected light to turn from a projection direction to a different angle and, hence, cause the image to be visible at a location that may be off-line from the projection direction owing to the index of refraction of the liquid. A viewing angle may be changed by exploiting the index of refraction. A projector-bearing drone could raise or lower itself in the water (or above the water if air-based) based on the image of refraction.

Figure 11:
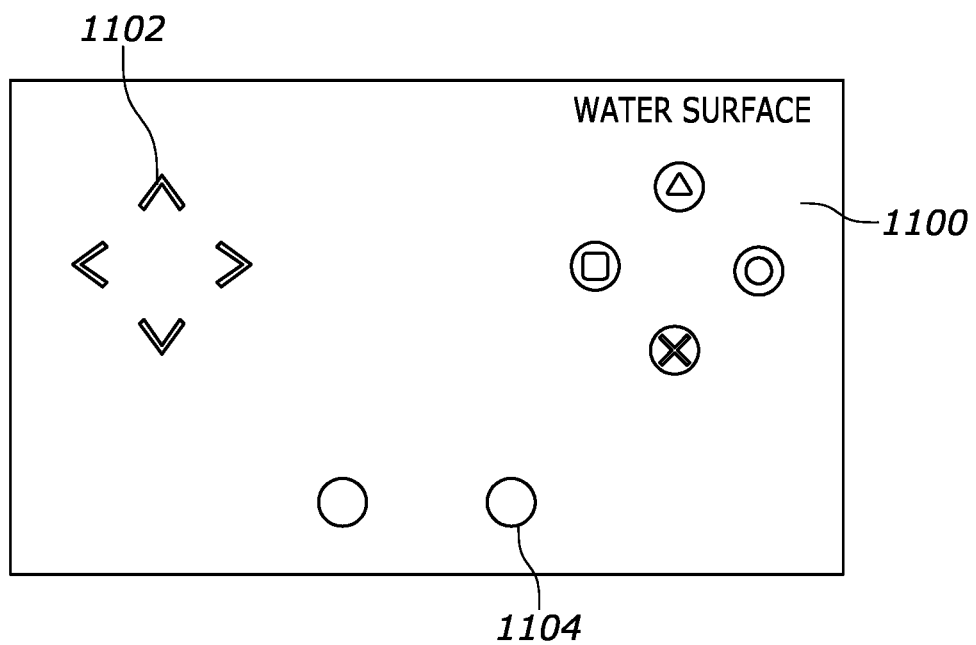
FIG. 11 illustrates example images projected onto water.

FIG. 11 illustrates further examples of images that may be projected onto water 1100 for interaction by a user. While FIG. 11 shows that the images are in a common plane, it is to be understood that some of the images may be presented in one plane (such as the surface plane), some may be presented on another plane (such as the bottom), and some may be holograms made to appear in the water, under the surface.

In the example shown, the images may be of computer game controller keys with interaction of an image producing the same result as manipulation of the corresponding key on a controller. For example, images 1102 of four directional keys may be projected onto the water 1100. Images 1104 of left and right stick buttons may also be projected onto the water. Further, images 1106 of controller geometric keys may be presented.

The images 1102, 1104, 1106 may be projected onto the water 1100 close together as they would be on a game controller, so that a user could interact with each image by simply moving his or her hand or finger to the desired image. Or, the images might be spaced from each other in water, so that a player would have to swim or wade from one image to another to interact with a desired image. This feature could add interest to a simulation that may be slowed down or that may be inherently slow-moving, with faster swimmers being advantaged over slower swimmers, for instance to combine both swimming ability and gameplay skills.

Figure 12:
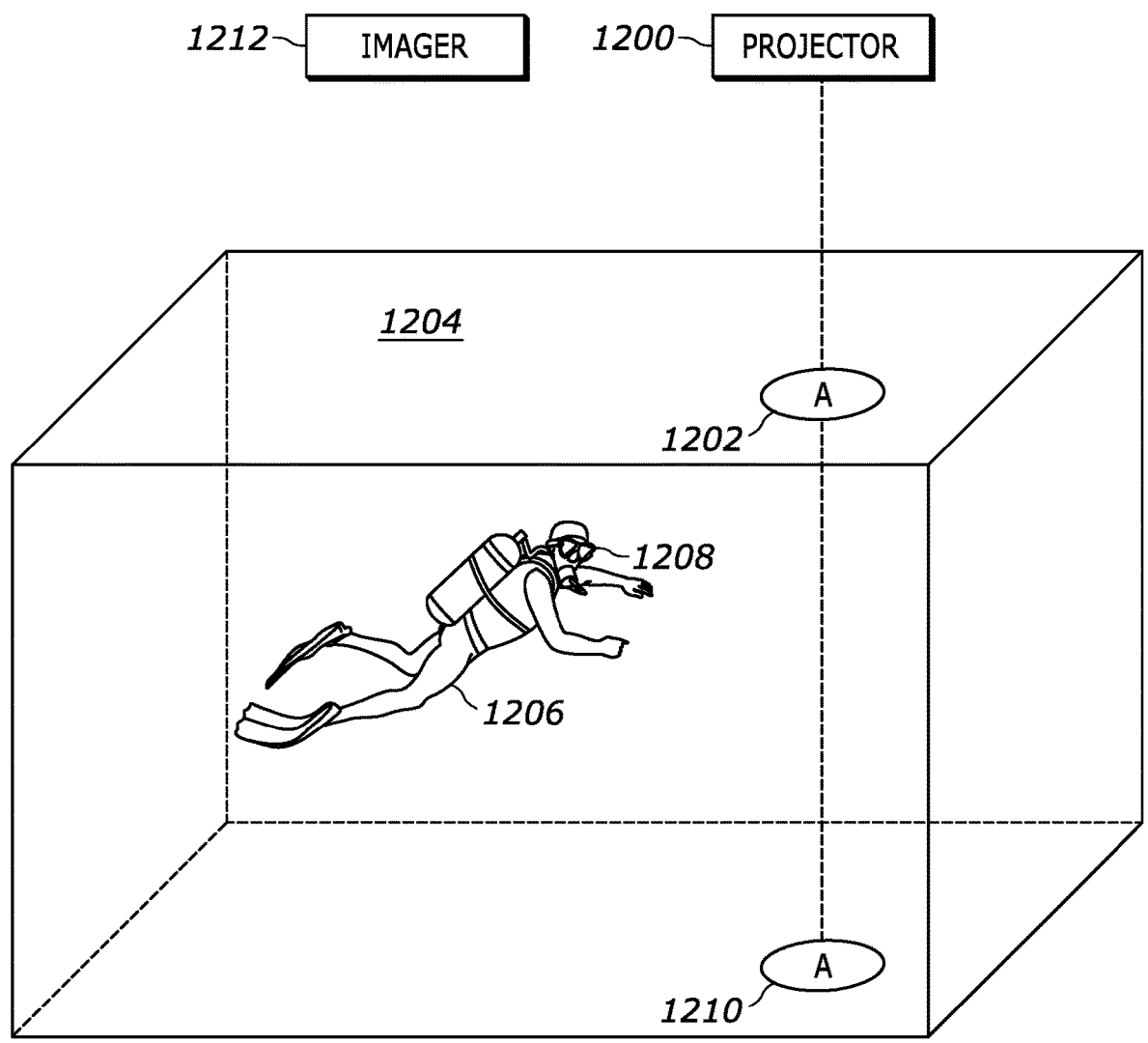
FIG. 12 illustrates an underwater player accessing images projected onto the top surface of water and refracted onto the bottom surface of the container.

FIG. 12 provides further illustration. A projector 1200 projects an image 1202 at an oblique angle relative to the surface 1204 of water in which a person 1206 wearing snuba (combination snorkel and scuba) gear 1208 is swimming. Owing to the refraction at the surface 1204, the image propagates vertically straight down to appear 1210 on the bottom of the pool. An imager 1212 such as a camera detects interactions of the person 1206 with the images 1202, 1210 for control signal input consistent with principles herein.

Note that images herein may be projected along a moving path in water to facilitate locomotion in virtual reality games, such that a player wearing a VR headset can walk in shallow water in place and still appear to go somewhere in a game owing to the passing images on the water.

When any of the water examples herein are implemented in a hot tubs, water temperature may be changed to make the user experience different things, and jets may be controlled to produce different haptic signals consistent with game play.

A waterproof controller could be used by a person in the pool, too, as well as projected image interactions. The water may be very shallow such as in a fountain, etc. VR or generic display technology may be used, in both cases water could be used as a lens and the surface modulated to achieve a desired effect. Not just control images but game images also may be projected into the water.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   project at least one image onto at least one liquid, the at least one image comprising images of keys of a computer game controller;
   receive indication of an interaction with the at least one image;
   based at least in part on the indication, correlate the image to at least one computer action, the computer action being a same action as produced by manipulation of a corresponding key on the computer game controller; and
   execute the computer action.

2. The device of claim 1, wherein the computer action comprises an action in a computer simulation.

3. The device of claim 1, wherein the liquid comprises water.

4. A device comprising:
   at least one computer memory that is not a transitory signal and that comprises instructions executable by at least one processor to:
   project at least one image onto at least one liquid;
   receive indication of an interaction with the image;
   based at least in part on the indication, correlate the image to at least one computer action; and
   execute the computer action, wherein the liquid comprises oil.

5. A device comprising:
   at least one computer memory that is not a transitory signal and that comprises instructions executable by at least one processor to:
   project at least one image onto at least one liquid;
   receive indication of an interaction with the image;
   based at least in part on the indication, correlate the image to at least one computer action; and
   execute the computer action, comprising at least one projector on a drone for projecting the image.

6. The device of claim 5, wherein the drone is a waterborne drone.

7. The device of claim 5, wherein the drone is an airborne drone.

8. The device of claim 1, wherein the indication of an interaction with the image is received from a camera.

9. The device of claim 1, wherein the indication of an interaction with the image is received from a motion sensor.

10. The device of claim 1, wherein the computer action comprises a computer game action.

11. The device of claim 1, wherein the indication of an interaction with the image is derived from ripples in the liquid.

12. An assembly comprising:
at least one processor configured with instructions to:
project images of keys of a computer game controller onto liquid;
receive an indication of interaction with the one or more images;
responsive to the indication, correlate the one or more images with an action, the action being a same action as produced by manipulation of a corresponding key on the computer game controller; and
execute the action.

13. The assembly of claim 12, wherein the action comprises an action of a computer game character.

14. An assembly comprising:
at least one processor configured with instructions to:
project one or more images are projected onto liquid;
receive an indication of interaction with the one or more images;
responsive to the indication, correlate the one or more images with an action; and
execute the associated action, wherein the indication comprises a camera image showing part of a person's body co-located with an image.

15. The assembly of claim 12, wherein the indication comprises signals from at least one motion sensor.

16. The assembly of claim 12, wherein the indication comprises a sonic indication.

17. A method comprising:
projecting, onto a liquid, images of keys of a computer game controller;
receiving indication of interaction with the images; and
based on the indication, controlling a computer game.

18. A method comprising:
projecting, onto a liquid, images of keys of a computer game controller;
receiving indication of interaction with the images;
based on the indication, controlling a computer game; and
using Snell's law to determine an angle of projection of the images.

19. A method comprising:
projecting, onto a liquid, images of keys of a computer game controller;
receiving indication of interaction with the images;
based on the indication, controlling a computer game; and
projecting the images to locations under a surface of the liquid.

* * * * *